US008493052B2

(12) United States Patent
Kim

(10) Patent No.: US 8,493,052 B2
(45) Date of Patent: Jul. 23, 2013

(54) APPARATUS AND TECHNIQUE TO DRIVE A VARIABLE LOAD VIA TRANSFORMER SECONDARY WINDING

(75) Inventor: Larry Joseph Kim, Austin, TX (US)

(73) Assignee: Articulate Labs, Inc., Austin, TX (US)

( * ) Notice: Subject to any disclaimer, the term of this patent is extended or adjusted under 35 U.S.C. 154(b) by 453 days.

(21) Appl. No.: 12/788,536

(22) Filed: May 27, 2010

(65) Prior Publication Data

US 2010/0327845 A1 Dec. 30, 2010

Related U.S. Application Data

(60) Provisional application No. 61/181,321, filed on May 27, 2009.

(51) Int. Cl.
*H01F 27/24* (2006.01)
*H02M 3/335* (2006.01)

(52) U.S. Cl.
USPC ........................................ 323/362; 363/21.02

(58) Field of Classification Search
USPC ........................................ 323/362; 363/21.02
See application file for complete search history.

(56) References Cited

U.S. PATENT DOCUMENTS

| | | | | |
|---|---|---|---|---|
| 4,103,112 | A * | 7/1978 | Korsky | 379/378 |
| 4,398,156 | A | 8/1983 | Aaland | |
| 6,430,063 | B1 * | 8/2002 | Nishimura et al. | 363/21.06 |
| 7,675,242 | B2 | 3/2010 | Longhino et al. | |
| 7,675,761 | B2 | 3/2010 | Cuadra et al. | |
| 7,706,424 | B2 | 4/2010 | Amada et al. | |
| 2005/0168087 | A1 * | 8/2005 | Yasumura | 310/120 |
| 2010/0327776 | A1 | 12/2010 | Yufuku | |

OTHER PUBLICATIONS

Yamada, Hajime, "A New Pulse Generator Using a Saturable-Core Transformer and a Switching Transistor", Jul. 14, 1961, pp. 29-35, No. 11.

* cited by examiner

*Primary Examiner* — Adolf Berhane
*Assistant Examiner* — Emily Pham
(74) *Attorney, Agent, or Firm* — Trop, Pruner & Hu, P.C.

(57) ABSTRACT

The primary of a transformer is driven at low voltages to provide high-voltage dynamic drive from the secondary to a load. A high-current source is placed in series with both the transformer secondary and load. At least secondary inductance of the transformer, hence impedance, is controlled through core saturation to transition secondary output to the load between high-voltage dynamic drive inductively coupled from the primary, and high-current drive serially connected through the secondary. Switching between high voltage and high current output is accomplished through the transformer; no additional switching devices need exist in the high-voltage path. Broad voltage and current capabilities of the configuration inexpensively improve transient drive of highly reactive loads.

20 Claims, 2 Drawing Sheets

APPARATUS AND TECHNIQUE TO DRIVE A VARIABLE LOAD VIA TRANSFORMER SECONDARY WINDING

REFERENCE TO RELATED APPLICATION

This application claims priority from U.S. Provisional Patent Application Ser. No. 61/181,321, filed May 27, 2009, the entire content of which is incorporated herein by reference.

FIELD OF THE INVENTION

This invention relates generally to electronic power circuitry, and particularly to methods and apparatus to drive highly reactive loads.

BACKGROUND OF THE INVENTION

The majority of loads to be driven by electronic devices are designed so as to present impedances consistent with low-cost semiconductor devices. This implies operation at readily available voltage or current sources. Resistive and low-reactance loads therefore present no challenge to conventional drive techniques.

Highly reactive loads and loads with inconstant impedances, such as gas tubes or motors, sometimes however require voltages or currents for transient behavior which are totally inconsistent with those required for later static operation. Multiple energy sources with entirely disparate characteristics are therefore required for tightly-controlled transient behavior.

Controlled magnetic core saturation to form switches or amplifiers of inductive components has been in use for many years to inexpensively drive large and/or unusual electrical loads. Current examples of these approaches include U.S. Pat. No. 7,706,424—'Gas discharge laser system electrodes and power supply for delivering electrical energy to same', #7,675,761—'Method and apparatus to control two regulated outputs of a flyback power supply', and #7,675,242—'Electronic ballast'. Prior art furnishes many examples of single-path control using magnetic components, but does not teach inexpensive control of multiple energy sources within a single device.

Highly inductive motors belong to a class of devices which initially require high winding voltage in order to quickly develop magnetic flux, but subsequently require high current at low voltage to perform work. Common practice of operating motors within the fixed voltage range of a power supply therefore forces a compromise between allowable winding inductance and transient response. Low inductance, however, exacerbates ohmic losses in high power applications where drive current must be increased to maintain output power requirements. A burgeoning application encountering these obstacles is found in electrically-powered transportation vehicles, the motors for which typically have compromised torque curves in order to meet system voltage constraints.

This category of loads therefore is much more expensive to drive quickly than more pedestrian loads, in that requisite drive circuitry often must be doubled to achieve dual voltage and current requirements. The use of semiconductors in the high-voltage path or multiple controlled reactors as well increases cost, in that high-voltage production processes are more expensive than processes for lower voltages. A need exists for a method and apparatus whereby loads of unusual or inconstant impedance may be inexpensively driven without degrading system transient performance.

SUMMARY OF THE INVENTION

This invention resides in the advantageous exploitation of controlled transformer core saturation to select one of multiple energy forces for application to a reactive or nonlinear load at a transformer output. A minimal configuration teaches selection between one force possessing high voltage capability and a second force possessing high current capability.

A method for inexpensively driving a reactive or nonlinear load with improved transient response comprising the steps of:

1. Coupling current into at least one primary winding of a transformer during a first period of time, so as to invoke an output response in at least one secondary winding;
2. Coupling current through at least one secondary winding of said transformer to said load during a second period of time; and
3. Employing magnetic core saturation to reduce the impedance of said at least one secondary winding during said second period of time, so as to facilitate current flow in a desired direction through both secondary winding and load.

DETAILED DESCRIPTION OF THE INVENTION

Figure 1:
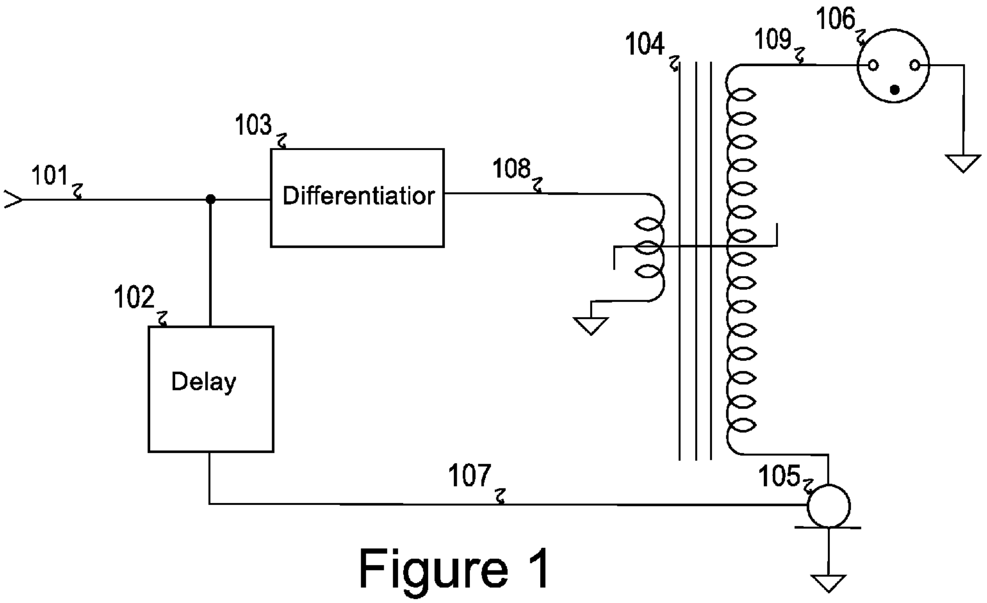
FIG. 1 shows a block diagram of a preferred embodiment of the present invention.

Referring now to FIG. 1, incoming command Signal 101 is applied to both Delay 102 and Differentiator 103. Although assumed to be a pulsed voltage signal herein, Signal 101 may as well effect dynamic control in other forms known to the art. Differentiator 103, under control of Signal 101, applies a voltage Signal spike 108 to the upper primary terminal of Transformer 104 at the incoming rising edge. The lower primary terminal of Transformer 104 is grounded, allowing Signal 108 to induce current in the primary of Transformer 104. Although it is assumed for this example that Differentiator 103 operates only on rising events, alternative implementations are anticipated to require differentiator outputs, usually bipolar in nature, on both rising and falling events. In response to Signal 101, Delay 102 outputs Signal 107, a replication of Signal 101 which is presumably delayed slightly less than the width of differentiated Signal 108. Termination of Signal 108 therefore occurs slightly after initiation of Signal 107. Signal 107 is supplied as input to controlled Current Source 105, the output of which is connected in series with the ground path of the lower secondary terminal of Transformer 104. The upper secondary terminal of Transformer 104 is connected to one terminal of Load 106, the second terminal of which is grounded. Under control of Signal 107, Current Source 105 therefore induces current (if possible) in both the secondary of Transformer 104 and Load 106.

From a quiescent state with no current flowing, Signal 101 initiates current in the primary of Transformer 104, through the action of Signal 108. This transformer current n this form, Signal 101 therefore causes 103 to apply controlled current pulses (within voltage and current constraints of the device) to the lower secondary terminal of Transformer 104. Delay 107 equally retards rising and falling events of incoming Signal 101, to become Signal 107, applied as input to Differentiator 103.

It is assumed that voltage constraints of Source 105 prevent achievement of core saturation in Transformer 104 without additional assistance. It is as well assumed that Transformer 104 is of high secondary-to-primary turns ratio. The secondary output of Transformer 104, shown as Signal 109, directly drives Load 106, shown to be a gas discharge tube which exhibits low impedance only after receipt of a high breakdown voltage. Composite effect of these conditions is that Transformer 104 produces a very high secondary voltage at Signal 109 as a direct result of the output of Differentiator 103.

The high secondary Signal 109 spike therefore ionizes the gas in Load 106, immediately decreasing its impedance. As this impedance drops, the resultant current developed saturates the core of Transformer 104, causing its secondary to become a low-impedance path for the current provided by Source 105. The series connection of low impedances of Load 106 and Transformer 104 secondary lower the voltage required at Source 105 to be within its voltage constraints, now facilitating current control and presumably subsequent cessation by Source 105.

Figure 2:
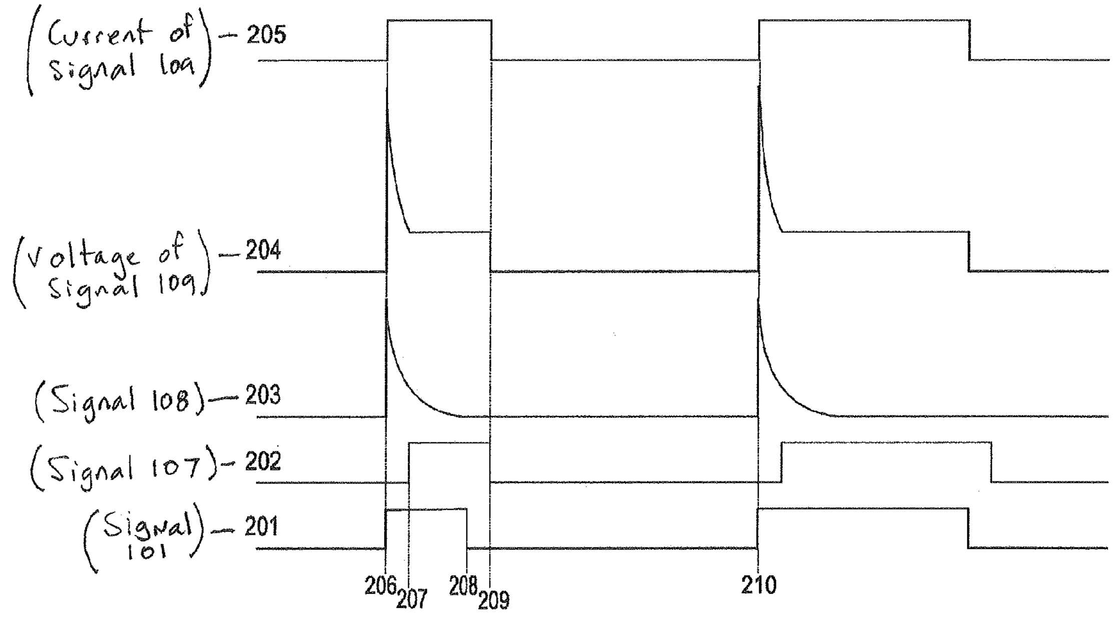
FIG. 2 shows the voltage and current waveforms of the embodiment of FIG. 1 in normal operation.

Referring now to FIG. 2, Trace 201 shows the voltage Signal 101, Trace 202 shows Signal 107, Trace 203 shows Signal 108, Trace 204 shows voltage of Signal 109, and Trace 205 shows current of Signal 109; all of FIG. 1.

The incoming Signal 201 can be seen to be delayed at Signal 202, and the resultant derivative spike from Differentiator 203 of FIG. 1 can be seen in Trace 203 at the rising event shown at Time Markers 206. In that Transformer 104 current at Time Markers 206 is inadequate to saturate the core, the resultant high effective turns ratio of Transformer 104 produces the high voltage spikes shown in Trace 204 at the rising event of Trace 203. Current allowance through Source 105 is then initiated at Time Marker 207, as shown in Trace 202. These high voltage spike of Trace 204 at Time Marker 206, when applied to Load 106 of FIG. 1, create a ionized path through Load 106 which lowers its impedance as breakdown is achieved. The increased current allowed by this reduced impedance then saturates the core of Transformer 104 of FIG. 1. In a saturated state, the secondary of Transformer 104 represents a low effective turns ratio, but most importantly, a low secondary impedance. The saturation of Transformer 104 therefore serves as a current switch to enable Load 106 current control by Source 105, both of FIG. 1. The combination of secondary voltage spike and switched current source therefore causes the current, as shown in Trace 205, to be a close replica of the incoming control voltage shown in Trace 201. Current is commanded to zero by Signal 101, shown in Traces 201, at Time Marker 208. Note that Load 106 ionization ceases of its own accord at the Time Marker 209, as current Source 105 is disabled. Lacking secondary current, Transformer 104 recovers from saturation at Time Marker 209. Time Marker 210 shows initiation of a second pulse cycle similar to that initiated at Marker 206.

Figure 3:
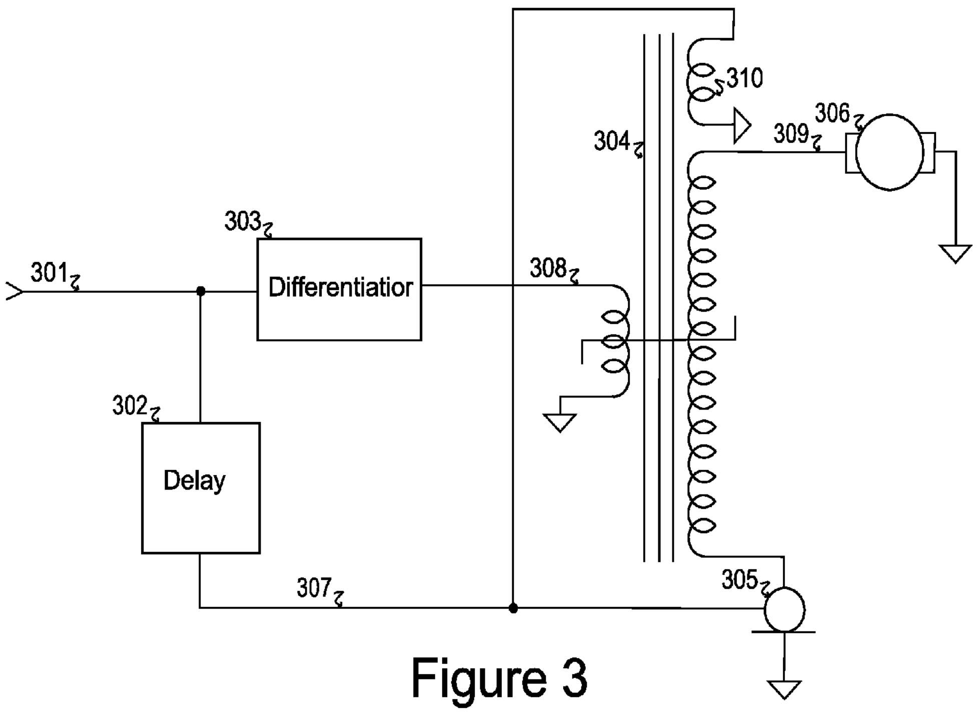
FIG. 3 shows a block diagram of an alternative embodiment of the present invention.

Referring now to FIG. 3, incoming Signal 301, Delay 302, Differentiator 303, Signal 308, Signal 309, and current Source 305 are analogous to Signal 101, Delay 102, Differentiator 103, Signal 108, Signal 109, and current Source 105, respectively, of FIG. 1. Transformer 304 differs from Transformer 104 of FIG. 1 by the addition of Control Winding 310, used to control saturation of the Transformer 304 secondary core. Gas discharge Load 106 of FIG. 1 has been replace by Motor Load 306, which exhibits high inductance.

The primary significant difference between Load 106 of FIG. 1 and Load 306 of FIG. 3 is that inductance of Motor Load 306 will resist current cessation, whereas the Load 106 of FIG. 1 exhibits no such behavior. Current interruption by Source 305 is therefore inadequate to terminate core saturation of Transformer 304 in a timely manner.

The circuit of FIG. 3 is distinguished from that of FIG. 1 by the extension of Signal 307 to additionally drive Control Winding 310. It is assumed that the core of Transformer 304 is less susceptible to saturation than that of Transformer 104, and that operational current through Load 306 is of itself inadequate to cause Transformer 304 core saturation. In that characteristics of Load 306 are antipathetic to secondary current cessation; Signal 307, used as Signal 107 in FIG. 1 to control Transformer 104 secondary current, additionally directly controls Control Winding 310. Under control of Signal 307, Winding 310 presumably adds or removes sufficient secondary core field strength to cause or disallow, respectively, secondary core saturation of Transformer 304, thus deterministically controlling current in Load 306. The addition of Winding 310 therefore extends use of the current invention to highly inductive loads.

Expansion of the simple control winding activation scheme used for exemplary purposes is anticipated to minimally include control of motor back-EMF as necessary.

Although exemplary specification of a single secondary core saturation is used above to select one of two possible energy sources (high voltage or high current), application of the current invention to magnetic topologies with multiple magnetic regions or which saturate in entirety will result in minor and anticipated departures from the embodiments shown. Resultantly, use of the invention with more than the two energy sources described is anticipated.

Although shown in examples of unipolar impedance change, those skilled in the art will readily apply the current invention in applications utilizing additional voltages, currents, polarities, and/or phase relationships. The relatively minor circuit and timing modifications to facilitate use of the current invention in controlling capacitive loads, in contrast to the exemplary inductive loads, is as well anticipated.

By the disclosure above, it can be seen that extremely fast and accurate current control may be effected in an unusual or highly reactive load, through use of controlled core saturation to select one of a plurality of energy sources in a transformer. The simplicity of the approach avoids the cost of commensurately unusual semiconductors or multiple magnetic devices.

I claim:

1. A system for driving a load including one of a reactive load and a nonlinear load comprising:

a transformer including at least one saturable magnetic region and at least one secondary winding to couple to said load;

first drive means to dynamically couple first current into at least one primary winding included in said transformer;

second drive means to dynamically couple second current through said at least one secondary winding of said transformer to said load; wherein said second drive means includes a current source in series with said at least one secondary winding with said at least one secondary winding between said current source and said load; and control means to synchronize said first drive means and said first current with said second drive means and said second current.

2. The system of claim 1 wherein said at least one saturable magnetic region is controlled by the second current.

3. The system of claim 1 wherein said at least one saturable magnetic region is controlled by a separate control winding included in said transformer.

4. The system of claim 1 wherein the load is inductive.

5. The system of claim 1 wherein the load is capacitive.

6. The system of claim 1 wherein the load exhibits nonlinear impedance.

7. The system of claim 1 wherein said at least one saturable magnetic region is additionally controlled to manage power reflected from the load, the load is in series with the current source, the first current is not DC, the transformer is not saturated during the first period of time, and the second current is DC.

8. The system of claim 1 wherein the load is in series with the current source, the first current is not DC, and the second current is DC.

9. A method for driving a load, including one of a reactive load and a nonlinear load, comprising:

coupling first current into at least one primary winding of a transformer for a first period of time;

coupling second current from a current source through at least one secondary winding of said transformer into said load for a second period of time; and reducing the impedance of said secondary winding through magnetic core saturation during said second period of time;

wherein the current source is coupled in series with the at least one secondary winding, and said at least one secondary winding is coupled between the current source and the load.

10. The method of claim 9 wherein a portion of the core of said transformer is saturated during said second period of time.

11. The method of claim 9 wherein the entire core of said transformer is saturated during said second period of time.

12. The method of claim 9 wherein said magnetic core saturation is controlled by load current developed through said at least one secondary winding.

13. The method of claim 9 wherein said magnetic core saturation is controlled by a separate control winding.

14. The method of claim 9 wherein said magnetic core saturation is additionally controlled to manage power reflected from the load.

15. A system comprising:

a transformer, including primary and secondary windings, to couple to a load that includes one of a reactive load and a nonlinear load;

a first circuit portion to couple first current to the primary winding during a first period of time; and a second circuit portion, to couple to the first circuit portion via the transformer, to (a) couple second current from a current source through the secondary winding and into the load during a second period of time; the current source coupled in series with the secondary winding with the secondary winding coupled between the current source and the load; and (b) reduce the impedance of the secondary winding through magnetic core saturation of the transformer during the second period of time.

16. The system of claim 15 wherein a portion of the core of the transformer is to be saturated during the second period of time.

17. The system of claim 15 wherein the first current is not DC, the transformer is not saturated during the first period of time, and the second current is DC.

18. The system of claim 15 wherein the magnetic core saturation is to be controlled in response to the second current.

19. The system of claim 15 wherein the magnetic core saturation is to be controlled by a separate control winding included in the transformer and separate from the primary and secondary windings.

20. The system of claim 15 wherein the load is in series with the current source.

* * * * *